METHOD FOR ENCASING RIGID MEMBERS WITH CONCRETE

Original Filed Sept. 13, 1965 3 Sheets-Sheet 1

INVENTOR.
BRUCE A. LAMBERTON
BY Tilberry & Body
ATTORNEYS

METHOD FOR ENCASING RIGID MEMBERS WITH CONCRETE

Original Filed Sept. 13, 1965 3 Sheets-Sheet 2

INVENTOR.
BRUCE A. LAMBERTON
BY Tilberry & Body
ATTORNEYS

METHOD FOR ENCASING RIGID MEMBERS WITH CONCRETE

Original Filed Sept. 13, 1965 3 Sheets-Sheet 3

INVENTOR.
BRUCE A. LAMBERTON
BY Tilberry & Body
ATTORNEYS

United States Patent Office

Re. 27,460
Reissued Aug. 15, 1972

27,460
METHOD FOR ENCASING RIGID MEMBERS WITH CONCRETE

Bruce A. Lamberton, Berea, Ohio
(Box 5951, Cleveland, Ohio 44101)

Original No. 3,397,260, dated Aug. 13, 1968, Ser. No. 657,455, June 26, 1967, which is a continuation of Ser. No. 486,786, Sept. 13, 1965, and a continuation-in-part of Ser. No. 446,346, Apr. 7, 1965. Application for reissue July 30, 1970, Ser. No. 59,589
Int. Cl. B28b *1/26*
U.S. Cl. 264—86 13 Claims

Matter enclosed in heavy brackets [ ] appears in the original patent but forms no part of this reissue specification; matter printed in italics indicates the additions made by reissue.

ABSTRACT OF THE DISCLOSURE

A form comprised of a sleeve of flexible porous material is positioned around an elongated rigid member with the ends of the sleeve pressed against the members to form a space between the form and the material. A cementitious slurry of a known liquid-cement ratio is pumped into the space until a pressure is built up and the form is inflated. The pumping is continued until some of the liquid in the slurry passes outwardly through the pores of the fabric and the liquid-cement ratio is lowered.

This application is a continuation of application Ser. No. 486,786, filed Sept. 13, 1965, now abandoned, and a continuation-in-part of application Ser. No. 446,346, filed Apr. 7, 1965.

This invention pertains to the art of forming cement or concrete bodies and more particularly, to method and means for coating or surrounding elongated rigid members with an impervious layer of cement or concrete.

The invention is particularly applicable to the encasing of columns, pipes, beams or tanks with a monolithic coating of cement or concrete and will be described with particular reference thereto; although it will be appreciated that the invention has broader applications.

In application Ser. No. 446,346 a plurality of flexible porous fabric forms, generally, but not always, in the shape of a toroid, are positioned in their ultimate desired positions and a cementitious grout having a high water-cement ratio is pumped into the form to inflate it. The pumping is continued until a substantial pressure is built up sufficient to force the water of the grout out through the pores of the form. The pressure is maintained until a substantial amount of the water in the grout has seeped or flowed outwardly through the pores of the form leaving behind a thickened and substantially rigid body having close to the ideal water-cement ratio for the hardening of the cement particles to the maximum strength.

The principles of that application are employed in accordance with the present invention to encase rigid members such as pipes, tanks, beams or columns of concrete, wood or metal with a layer of hardened cement for the purpose of strengthening the member, rigidifying it, or protecting it from moisture, fire or other adverse conditions.

Thus, it has been conventional in the art of encasing elongated rigid members with cement or concrete, to position a rigid form around the member in spaced relationship therewith. A liquid cement is poured into this space and allowed to harden. Thereafter, the form can be removed and oftentimes reused. Such rigid forms are expensive to build, expensive to install, expensive to remove and expensive and bulky to store when not in use. Also, they usually have a relatively short life.

In the case of repairing bridge piers which have been eroded away by water action, it has been conventional in the past to build a water tight coffer dam around the pier, pump out the water and then build a rigid form to receive the cement. This process is laborous, time consuming, expensive and often-times dangerous, particularly when the bridge pier is exposed to rough water.

The present invention contemplates a new and improved method and arrangement for encasing such rigid members with a monolithic coating of cement or concrete which overcomes all of the above-referred to difficulties and others and enables such coating to be made economically in a minimum length of time and with a maximum strength and density of concrete.

In accordance with the present invention, the member to be encased, which is normally a relatively elongated member, is first in part or in toto surrounded by a form defining a totally closed space having walls which, at least in part, are porous and will readily pass liquids. Thereafter, a cementitious slurry is pumped into the space between the walls of the form and the member until the space is completely filled. Thereafter, the pumping is continued until a pressure is built up sufficient to force the liquid of the slurry to flow outwardly through the porous sidewalls. The pressure is maintained for a period of time sufficient to allow a substantial portion of the liquid of the slurry to pass outwardly through the pores of the form and the slurry is substantially thickened or is even completely rigid. Thereafter, the cementitious particles of the slurry are allowed to harden or set up.

"Slurry" as used hereinafter means any liquid suspension of solid particles of a size varying from one micron up to and including 0.005 inch capable of being pumped through pipes or conduits for distances of from one to any number of feet required for the particular operation to be carried out. The slurry may also include various substances for lubricating the particles so that they will slide more easily one over the other or for assisting in maintaining these particles in suspension. The slurry may also contain granules larger than the particles above referred to, but these will normally be referred to as an aggregate.

Some of the particles may be of a cementitious type, such as portland cement, which will react either with other particles or with the liquid vehicle or both to form a solid. Such a slurry will be referred to as a cementitious slurry or a grout. The grout, when it hardens, will be called hardened cement or concrete. Concrete generically includes hardened cement whether or not it contains an aggregate.

Water-cement ratio is the ratio of the weights of the water to the weights of all cements used in the slurry. Pozzolans are normally considered equivalents to or substitutes for cement and when employed in the slurry are considered a cement in calculating the water-cement ratio. Sand or aggregate may then be added to the mix in amounts that will be suspended therein but this does not alter the water-cement ratio.

By porous is meant a material having openings or pores therethrough large enough to at least pass the liquid of the slurry when under pressure but small enough to prevent the passage of essentially all of the particles. It will be appreciated that a pore opening may be larger than an individual particle and still prevent passage of such particles. In such instances, two or more particles, attempting to pass through the opening are pore at the same time bridge the opening, effectively plugging it. In general, the pore or opening size should be between 1.0 and 1.5 times the maximum particle size.

Setting up as applied to a cementitious slurry or grout means where water-cement ratio has either been reduced sufficiently or the cement has hydrated sufficiently or both that the mixture has completely lost any flow characteristics but has not yet attained physical strength. The strength is obtained by the ultimate hydration of the cement particles. Setting up takes place as soon as the water-cement ratio is reduced to or below 0.35 while hydration may take days or weeks to go to completion. A grout which has set up and then completed at least a substantial part of its hydration will be referred to as "hardened."

The present invention attempts to make beneficial use of a phenomenon which has long plagued the field of pressure grouting, namely, that when it is attempted to fill cracks and voids below the earth's surface with cement by using pressure to force a cementitious slurry through the cracks and into the voids, the particles in the slurry block up the cracks even though of a width larger than the largest particle size in the slurry and prevent the further movement of the particles through the cracks into the remote voids. Apparently two or more of the particles in attempting to go through a crack at the same time bridge the crack thus restricting its opening. Thereafter, smaller particles bridge this restricted opening in the same manner until very quickly even the cement particles having a size on the order of 10 microns will not pass through the openings. In effect, the various particles in the slurry form a "filter bed" to prevent the passage of any particles of any size. This filter bed effect can take place quite rapidly and once it starts nothing can prevent its continuing. If the pressure is maintained, however, water only will still pass through such filter bed. Heretofore the passage of the water into the voids beyond the filter bed without also carrying sufficient cement particles to improve soil characteristics was considered quite detrimental.

The present invention uses this "filter bed" phenomenon to good advantage. Thus, it is known that the higher the water to cement ratio employed, the easier it is to pump the grout particularly over long distances.

It is further known that a grout having a water-cement ratio below about 0.35 sets up very rapidly and has an ultimate strength much greater than grouts of the higher water-cement ratios.

It is also known that for most portland cements the final water to cement ratio should not be less than 0.25, which is the minimum required for complete hydration of the cement.

Thus the present invention employs easy to pump slurry having a water to cement ratio in excess of 0.45, e.g., up to 0.65, or even more with type III portland cement. The slurry is pumped into the space between the form and the member until filled and the liquid of the slurry begins to flow outwardly through the pores forming the "filter bed" adjacent the porous surface. As the filter bed forms, the pressure rises forcing the water to flow through the filter bed and the pores of the form while the cement particles remain behind resulting in a reduction in the water to cement ratio to a quick setting but fully hardenable range of from 0.25 to 0.40. It is, of course, true that before the filter bed starts to form there is a blush of cement particles which will have passed through the porous surface of the form but tests have indicated that only one or two percent of the total cement particles in the space do so and thereafter the water coming through is clear or almost clear. This water washes away any of the particles that might have initially come through.

In order to force the water through the filter bed and out of the form, it is usually necessary in accordance with the invention that substantial ultimate pressure on the order of 15 to 100 p.s.i. be employed. These pressures, of course, exert an outward force on the walls of the form and in preferred embodiments of the invention, the form is made from a flexible porous fabric which inflates under such pressures. These pressures create tension forces in the walls of the form which can possibly exceed the bursting strength of many fabrics. It is therefore necessary that in all instances a fabric or reinforcements for the fabric making up the form be provided which, taking into consideration the dimensions of the form and the pressures to be employed, will withstand the resultant tension forces. Of course, as the dimensions of the form are increased, the forces developed on the walls of the form by a given pressure likewise increase. For the type and size of structures which the present invention contemplates, vegetable and animal fibers such as cotton or wool generally do not have sufficient strength and in all instances, it is preferred to employ the synthetic high strength fibers such as nylon, fiberglass or the like and these fabrics should be woven into a sheet or tube of a thread count and/or strand size to give the desired porosity and strength.

The synthetics have further desirable characteristics over the natural fibers, namely, they are not wetted by the water of the slurry and do not swell up to block the openings between strands. As such they retain their strength and also aid in the formation of the filter bed. Further, nylon and similar materials have an inherent elasticity which is beneficially used to maintain the pressure on the slurry after the pumping has stopped. Also under the tension forces, the individual strands can slip relative to one another to align themselves into a mesh fabric with uniform size openings or pores.

The pressure employed in the grouting must also take into consideration the pressure required to force the water in the slurry outwardly through this filter bed in a time period less than that required for the cement to set up. This time period is in turn affected by the setting time of the cement employed and whether or not retarders or accelerators have been employed in the slurry. However, in all instances it is believed necessary to maintain the material in the form under pressure, particularly if the form is flexible, until such time as the cement has at least commenced to set up, otherwise when the pressure is removed, the flexible form will sag and will lose its inflated shape. Also, tests have shown that cement which has set up under pressure in accordance with the invention has a higher density and a much higher four or seven day strength than the same cement which has set up not under pressure. The invention contemplates maintaining a pressure of from 15–75 pounds per square inch until such time as the cement has at least commenced to set up.

As heretofore indicated, the form may be constructed so as to take any one of a number of different shapes when inflated by the grout under pressure. When a fabric or woven material is used for the entire form, then normally a shape must be employed which has a maximum bursting strength for a given type of material.

Further in accordance with the invention, an elongated rigid member is surrounded with a sleeve of porous fabric material. The ends of the sleeve are then tied or pressed inwardly so as to engage the entire periphery of the member with a sufficient pressure as to cause the formation of a filter bed when the slurry attempts to press thereby and a cementitious slurry is then pumped into the space between the sleeve and the sides of the member to inflate the sleeve. The pressure is then maintained until the filter bed is built up and enough of the liquid of the slurry has passed outwardly through the filter bed and the pores of the form that the slurry has substantially thickened or set up. The cement is then allowed to harden and the form may be removed desired and reused.

The invention has the desirable attribute that the forms are relatively light in weight, are easily handled and are easily placed in position with a minimum of equipment and labor. In the case of steel columns or beams, these beams or columns may be placed in position and riveted or welded into final assembly and then the column or beam may be permanently protected by casting the cement around the beam or column in its final ultimate position.

The principal object of the present invention is a new and improved method and means for encasing rigid members in a monolithic layer of cement or concrete which is simple, economical and which results in the cement setting up much more rapidly so that the members can be handled and moved, if desired, earlier than heretofore has been possible.

Another object of the invention is the provision of a new and improved means and method for encasing rigid members in cement or concrete wherein a relatively high water-cement ratio cementitious grout is employed which can be pumped long distances and yet, will have extremely high strength characteristics when set up and hardened.

Another object of the invention is the provision of a new and improved arrangement for encasing rigid members in cement or concrete wherein the liquid or plastic cement has its water-cement ratio decreased after it is placed in position.

Still another object of the invention is the provision of a new and improved arrangement for coating rigid members with cement or concrete wherein the forms are light in weight, easily handled and may, if desired, be reused.

The invention may take physical form in certain parts and arrangements of parts and steps and combinations of steps, the preferred embodiments of which will be described in the specification and illustrated in the accompanying drawings which form a part hereof.

Figure 1:
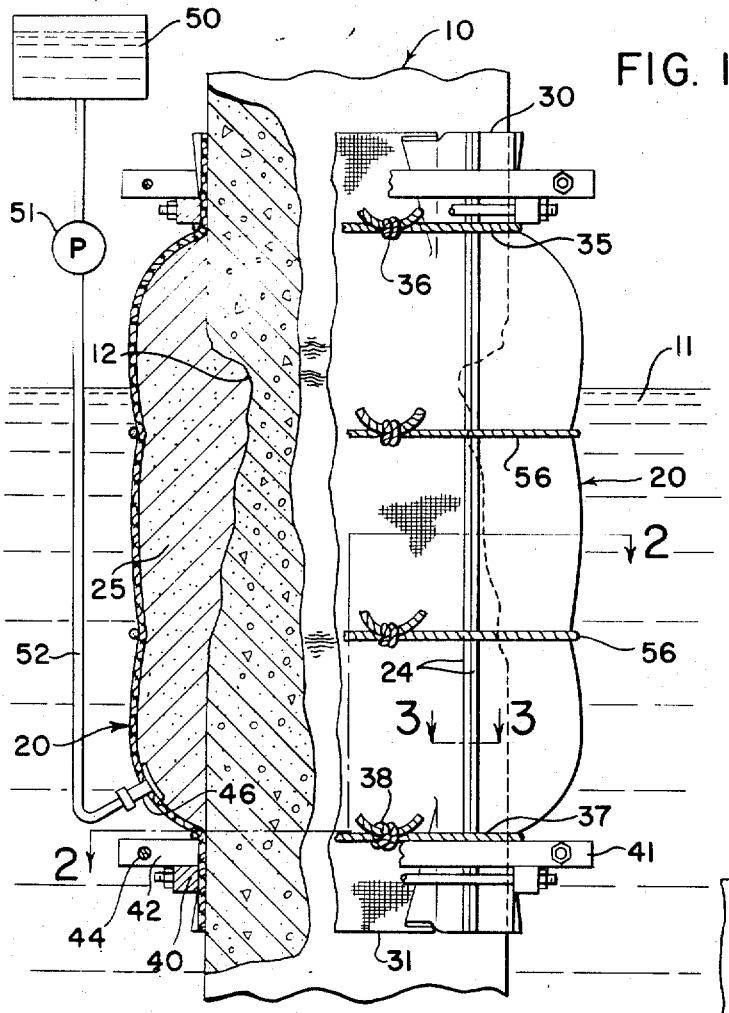
FIGURE 1 is a view partly in section showing a portion of a bridge pier eroded by the action of the water surrounded by a form filled with a hardened cement illustrating a preferred embodiment of the invention.

Referring now to the drawings wherein the showings are for the purpose of illustrating preferred embodiments of the invention only and not for the purposes of limiting same, FIGURE 1 shows an intermediate section of a bridge pier 10 for a bridge or the like extending from a position above to a position below the surface of a body of water 11, which pier 10 has been eroded as at 12 by the action of the water on it and must therefore be repaired. The pier 10 forms no part of the present invention and may be constructed in any known manner and may be of cement, with or without aggregate, and may be reinforced with steel beams or rods not shown. Also the pier 10 may be of any desired cross-sectional shape such as cylindrical or oval, but in the preferred embodiment is shown as being generally rectangular.

Heretofore, to repair such eroded portions 12, it was necessary to build a coffer dam around the pier 10, remove the water and then fill in the eroded portion 12 with a plastic cement having such a consistency that it will support itself in position against the forces of gravity while it is hardening. Alternatively, it has been conventional to build a rigid form around the pier 10 from a point below the lower limits of the eroded portion 12 to a point above the upper limits of the eroded portion and then pour in a liquid cement having a water-cement ratio such that when it hardened it would have a maximum strength and resistance to further erosion. After the cement had hardened, the form was normally removed.

In accordance with the present invention, however, a porous sleeve 20 of a length sufficient to reach from the point below the lower limits of the eroded portion 12 to a point above the upper limits of the eroded portion 12 and of a diameter or peripheral length at least slightly greater than the diameter or peripheral length of the pier 10, is positioned around the pier 10 so as to at least lap the ends of the eroded portion 12.

The sleeve 20 may be formed in any one of a number of different ways and may be formed from a number of different kinds of materials. In the preferred embodiment, however, the sleeve is made from a sheet of woven fabric of the appropriate length and width which is placed around the pier 10 and its vertically extending edges 23 suitably fastened together. This fastening may be done in any one of a number of different manners, but in the preferred embodiment, each edge 23 is folded outwardly at 24 (see FIGURE 3) and then back inwardly again as at 25. The outwardly extending portions 24 of each edge 23 are placed in abutting engagement and a portable sewing machine is moved longitudinally along the abutting edges to stitch the abutting portions together as at 26. It is to be noted that the tensile stresses which will ultimately be placed on this stitching 26 are very substantial and ordinarily at least two rows of stitching are employed and the threads forming the stitching are quite heavy so as to have a substantial tensile strength. Normally a conventional chain type stitch is employed such that when the repair job on the pier 10 is completed, the chain stitch can be readily ripped out by starting at one end and pulling the thread as is known in the art and the sheet of fabric material then removed and reused.

The material from which the sleeve is made may take a number of different forms, but in the preferred embodiment, is made of a woven sheet of nylon strands of a relatively loose weave such that the sheet is quite porous and water can flow readily therethrough. A nylon fabric having the following characteristics is preferred: 23 x 21 thread count, 840 denier, single ply, plain weave. Such a fabric has rather large pore openings of approximately $\frac{1}{32}$ inch and has tensile strengths of 393 x 321 pounds per inch respectively. It will be appreciated that metallic reinforcing members can be woven into the fabric if desired, although normally they are not necessary.

Also it will be appreciated that portions of the fabric can be coated with a filler material such that portions of the form will be nonporous. It will also be appreciated that the form can be made up of a nonporous sheet having one or more areas or windows therethrough which are porous.

Regardless of the exact materials used, or how the material is formed into a sleeve, once the sleeve 20 has been positioned around the pier 10 with its upper edge 30 above the upper limits of the eroded area 12 and its lower edge 31 below the lower limits of the eroded portion 12, the ends must be brought into engagement with the sides of the pier 10. This may be done in a number of different ways, but in the preferred embodiment, a rope 35 preferably of nylon is wrapped around the upper end of the sleeve 30, pulled under tension and tied as at 36. In the same manner, a rope 37 is wrapped around the lower end 31 and tied as at 38.

In each instance, the excess fabric may be folded, pleated or otherwise under the ropes 35, 37, it being noted that any small passages resulting from such pleating or folding will plug up with the particles of the slurry in the same manner as the pores of the fabric as will be hereinafter described.

In some instances when the pier 10 has an extremely long, flat, horizontal dimension, it will be impossible to tie the rope 35, 37 tightly enough to hold the fabric against the sides of the pier when the form 20 is under pressure. In such instances, and this is more clearly shown in FIGURE 2, horizontally extending beams 40, 41, 42 may be placed adjacent the ropes 35, 37 so as to press the ends 30, 31 against the sides of the pier 10. Suitable tension members 44 may be employed to pull these beams into tight fitting engagement with the sides of the form 10.

Prior to placing the form 20 in position around the pier 10, a nipple 46 is inserted into the fabric so that a cementitious slurry may ultimately be pumped into the inside of the form. This nipple 46 in the preferred embodiment is inserted into the wall of the form by forcing the strands of the fabric aside to make room therefore. By such a procedure the fabric is not weakened by cutting the strands. The nipple 46 has a flange 47 on the inner end to prevent it from being forced out of the position in the fabric 20.

When the form 20 is positioned as is shown in FIGURE 1, a source of a cementitious slurry 50 is connected through a pump 51 and hoses 52 to the nipple 46. The cementitious slurry employed may use any desired material which will harden to a firm dense layer, but in the preferred embodiment the cementitious material is portland cement and the cementitious slurry employed has the following general range of ingredients:

Portland cement, two cubic feet or 188 pounds
Pozzolans in the form of fly ash: one cubic foot or 75 pounds
Sand: three cubic feet or 330 pounds
Water: fifteen gallons or 118 pounds
Intrusion-Aid: manufactured by Concrete Chemicals Co., one sack or 2⅝ pounds It will be appreciated that in the trade, pozzalans are considered as cementing materials and if pozzolans are omitted, then an equivalent amount of portland cement should be added. It is also known that it is possible to substitute from 15–50% of pozzolans for the portland cement without adversely affecting the qualities of the hardened cement.

The Intrusion-Aid contains small amounts of aluminum powder which react with the cement as it hardens to produce minute quantities of gas which result in an expansion action to counteract to the normal contracting action of the portland cement as it hardens. The Intrusion-Aid also contains other ingredients for assisting and maintaining the flow characteristics of the slurry as it is pumped over long distances and also for helping to maintain the particles in suspension.

Such a slurry as above described has a water-cement ratio based on weight of approximately 0.45. Such a slurry, in the absence of accelerators, will normally require approximately 24 hours to set up. Obvously, higher water-cement ratios may be employed.

In practice, when the slurry is pumped into the form 20 in a collapsed state, it first inflates the form to its maximum dimensions. Inasmuch as the fabric is relatively flexible, it does not require much, if any, pressure to bring about the inflation. However, as soon as the form is inflated, and a pumping of the cementitious slurry is continued, a very small amount of the finer particles of the slurry passes outwardly through the pores of the form. However, the remaining particles in the slurry immediately start to block up the pores of the form forming a filter bed as above described and in a very short time only clear water passes outwardly through this filter bed and through the pores of the form. The pumping of the slurry is continued until a previously calculated (or previously determined by experiment) pressure is reached, at which time the pumping is stopped but the pressure is maintained.

As the water flows outwardly through the filter bed and the pores of the form, the water-cement ratio progressively from the form inwardly is very quickly reduced dependent upon the grout pressures employed. It has been found that a grout pressure of between 15–100 pounds per square inch will reduce the water-cement ratio for a substantial thickness to somewhere between 0.30 to 0.35 in approximately two to five minutes and at this ratio, the slurry has set. As soon as this setting up action has taken place, the pressure may be removed. The set up slurry, while not having any appreciable strength, will no longer plastically deform and the hydration of the cement particles can then take place. The cement hardens resulting in a cement or concrete body 25. During the hardening, the nylon strands of the fabric which were stretched by the pressure on the inside of the form when it was being inflated, continue to exert an inward pressure on the hardening cement resulting in a cement of highly improved characteristics such as density, early strength and ultimate strength.

The form 20 may be allowed to remain in place. As nylon does not rot or deteriorate with time, the form will protect the surface of the cement for long periods of time, thus preventing spalling or other problems characteristic of cement and also protecting the surface of the cement from the erosion characteristics of the water 11.

Pressures on the slurry should not be employed nor should the pressures be continued for such lengths of time that the water-cement ratio goes below 0.25 because this is the minimum amount of water required to produce total hydration of the cement.

In some instances when the size of the pier 10 is such that the pressures which will be developed on the inside of the form 20 are sufficient to rupture the form, or where it is desired to hold down the maximum thickness of the cement around the eroded portion 12, reinforcing ties 56 may be placed around the form 20 prior to its inflation. These reinforcing members 56 may be of steel, rope or the like.

It is further to be noted that when there are small openings under the ropes 35, 37 or under the beams 40, 41, 42, that these openings will plug up with the particles of the slurry in the same manner as the pores of the form 20.

Figure 2:
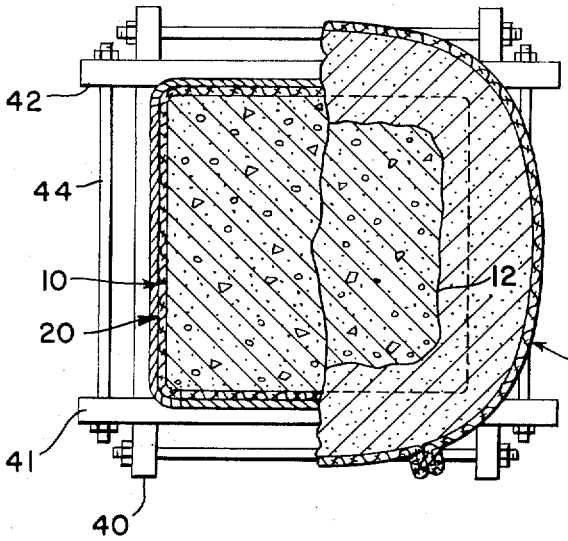
FIGURE 2 is a cross-sectional view of two different portions of the pier of FIGURE 1 taken approximately on the line 2—2 thereof.

From FIGURE 2 it will be seen that the ultimate body which results around the pier 10 will have a generally cylindrical shape in cross section. If for any reason this shape is considered undesirable, rigid forms may be placed around the form 20 which will shape the ultimate body as desired. In the event such forms are employed, they should normally have passages therethrough so that the water from the slurry on the inside of the form 20 can readily pass therethrough after it has passed the form 20.

Figure 5:
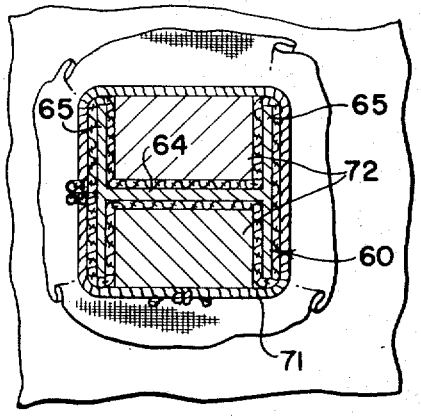
FIGURE 5 is a cross-sectional view of FIGURE 4 taken approximately on the line 5—5 thereof.
Figure 4:
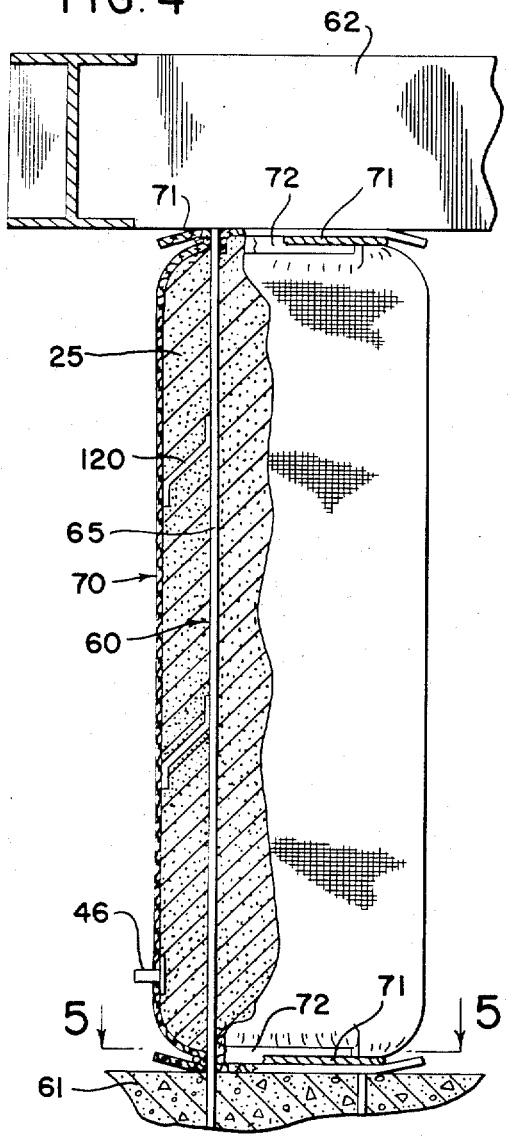
FIGURE 4 is a side view of a vertically extending beam in a building partly in section showing a form and hardened cement surrounding same illustrating an alternative embodiment of the invention.

FIGURES 4 and 5 show the invention as applied to a vertically extending beam 60. The beam 60 may be the supporting upright for a building or may be the supporting member of a bridge pier or the like. In either event, the beam 60 extends from a foundation 61 to an overhead beam or member 62 to be supported. The beam 60 may be of any desired cross-sectional shape such as a round bar, tube, channel, but in the preferred embodiment is shown as an I-beam having a web 64 integrally joining a pair of spaced parallel flanges 65.

Figure 3:
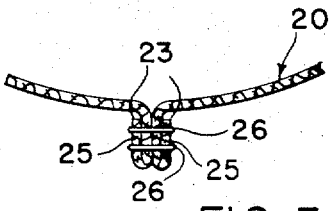
FIGURE 3 is a fragmentary cross-sectional view of FIGURE 1 taken approximately on the line 3—3 thereof.

In this instance a fabric form 70 in the shape of an elongated sleeve is placed around the beam 60. If there is no overhead supporting member 62, the form may be in the shape of a sleeve which is slipped over the upper end of the beam 60, but if the member 62 is in place, then the form 70 will be made from a sheet of fabric material the vertically extending edges of which are brought into abutting engagement and stitched as is shown in FIGURE 3. After the form 70 is in position, blocks 72 are positioned between the flanges 65 so as to press the fabric of the form into engagement with the inner surfaces of the flanges 65 and the web 64. Thereafter, a nylon rope is wrapped around the upper and lower ends of the form 70 to press the fabric tightly against the outer surfaces of the flanges 65 and the outer edge of the blocks 72. This is done top and bottom on the beam 60. Thereafter, a cementitious slurry as above described is pumped into the form through nipple 46 until the form 70 is completely inflated and the pumping is continued as described heretofore until the water-cement ratio is substantially reduced. The cement is then allowed to harden and the form 70 may be removed if desired.

It will be appreciated that in some instances it is unnecessary to use the blocks 72, it simply being necessary to provide a form 70 which has a length somewhat greater than the length of the beam 60 to be coated and this excess material is stuffed into the space between the inner surfaces of the flanges 65 and the web 64. When the cementitious slurry inflates the form 70, this excess material is pressed against the upper surface of the member 61 and the lower surface of the beam 62 and the resultant passages thereby are so small that a filter bed is created which prevents the flow of the particles of the slurry therepast.

Figure 6:
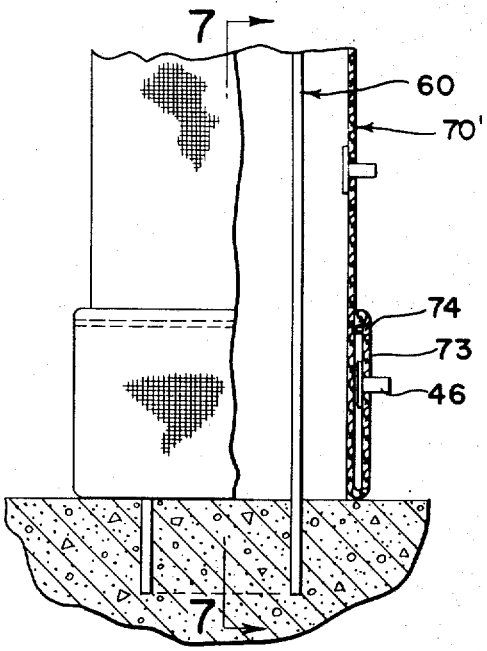
FIGURE 6 is a fragmentary view of the lower end of a beam showing an alternative embodiment of the invention.
Figure 7:
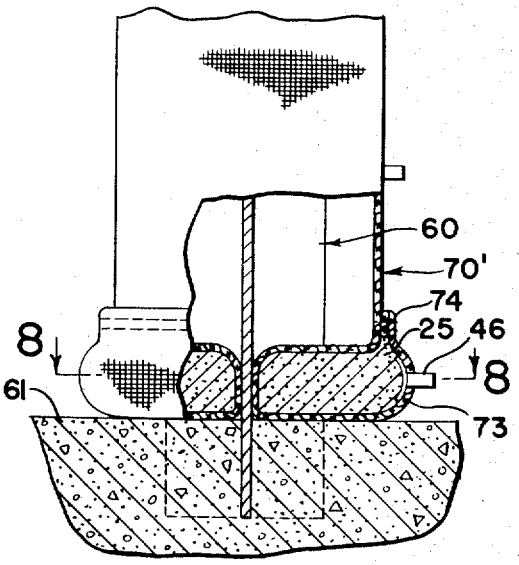
FIGURE 7 shows the form of FIGURE 6 inflated.
Figure 8:
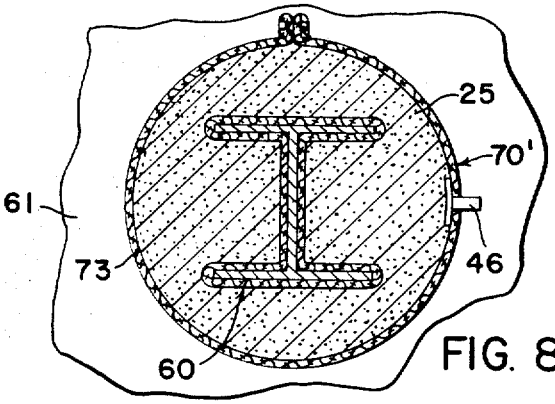
FIGURE 8 is a cross-sectional view of FIGURE 6 taken approximately on the line 8—8.

FIGURES 6, 7 and 8 show an alternative embodiment. Here the form 70' is provided with a large hem or tube 73 at one or both ends by doubling back the ends of the form and stitching as at 74. A nipple 46 through one wall of the hem or tube enables the cementitious slurry to be pumped thereinto. When the hem or tube 73 is inflated, as shown in FIGURE 7, it takes the form of a toroid with the inner surfaces conforming to the shape of and tightly gripping the outer surfaces of the beam 60. Once the hems or tubes 73 are inflated, then the remainder of the form 70' can be inflated resulting in the beam 60 being totally encased in cement 25. The inflated hems, by tightly gripping the surfaces of the beam, provide a seal at the ends of the form and also serve to locate and space the cylindrical walls of the form from the intermediate portions of the beam 60.

Figure 9:
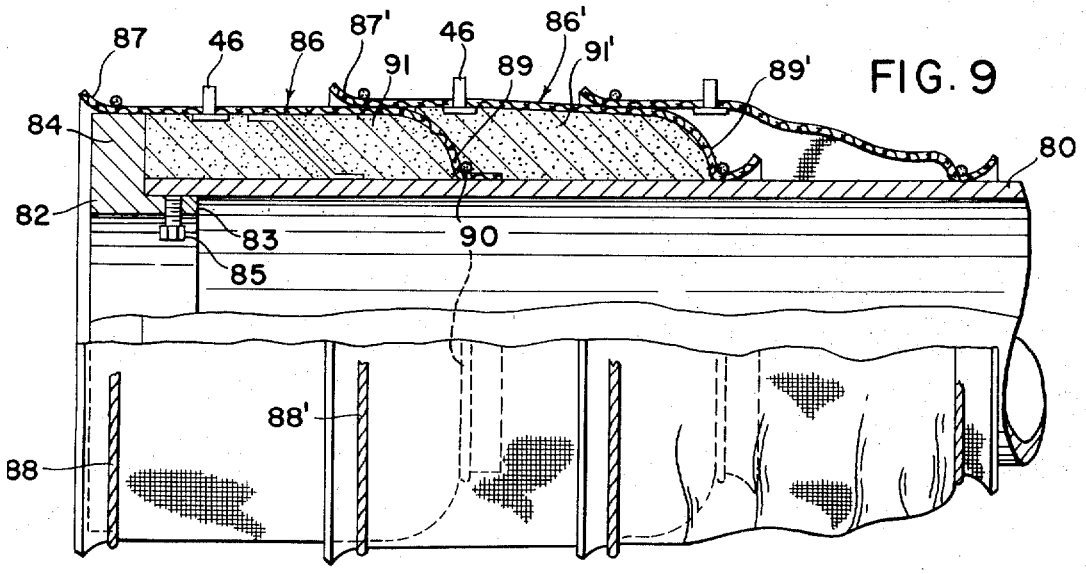
FIGURE 9 is a side view partly in section showing a steel pipe surrounded by a form filled with hardened cement illustrating an alternative embodiment of the invention.

FIGURE 9 shows the application of the invention for coating a pipe 80 when the length of the pipe is greater than the maximum available length of fabric sleeve and wherein it is desired to have the cement end flush with one end of the pipe 80. In this embodiment of the invention a ring 82 L-shaped in cross section and having an axially extending flange 83 and a radially extending flange 84, is positioned so that the axially extending flange 83 is inside of the end of the pipe 80 and fastening means 85 are provided for preventing removal of the ring 82 from the end of the pipe 80. The outer diameter of the radial flange 84 is equal generally to the desired outer diameter of the cement casing around the pipe 80. Thereafter, a cylindrical form 86 is positioned around the end of the pipe 80 so that one end 87 overlaps the outer surface of the flange 84. A tension member in the form of a rope 88 is then drawn tightly around the form and the flange 84. The other end 89 of the form 86 is then tied tightly into engagement with the outer surface of the pipe 80 by means of a tension member 90. The form 86 is then inflated with a cementitious slurry 91 as described heretofore, which slurry hardens into a monolithic cement layer. The form 86 may then be removed or left in position. In either event, a second sleeve 86' is positioned around the pipe 80 so that its end 87' overlaps the right hand end of the form 86 and this end is brought into pressure engagement with the outer surface of the cement 91 by means of a tension member 88'. In the same manner, the other end 89' of the form 86' is brought into pressure sealing engagement with the outer surface of the pipe 80 and thereafter the form 86' is filled with a cementitious slurry 91' under pressure as heretofore described which is then allowed to harden. This process is continued until the entire length of the pipe 80 is coated with cement. When the opposite end of the pipe 80 is reached, a rigid form member similar to the form 82 is employed to insure that the cement will be flush and square with the end of the pipe 80.

Figure 10:
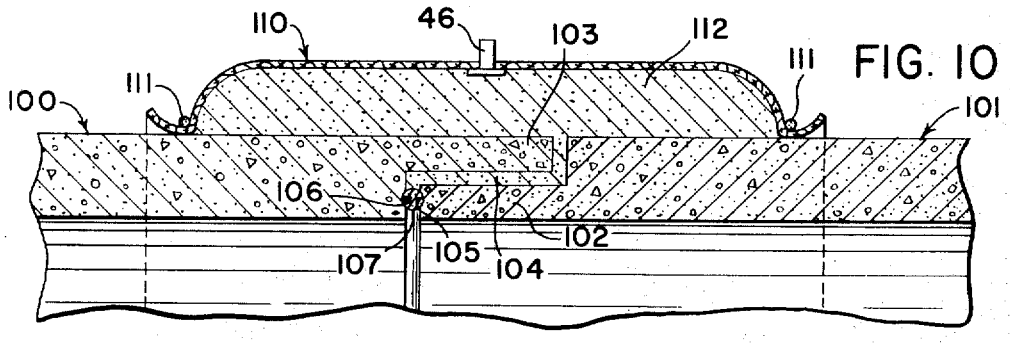
FIGURE 10 is a side cross-sectional view showing the application of the invention to enclosing a pipe joint.
Figure 11:
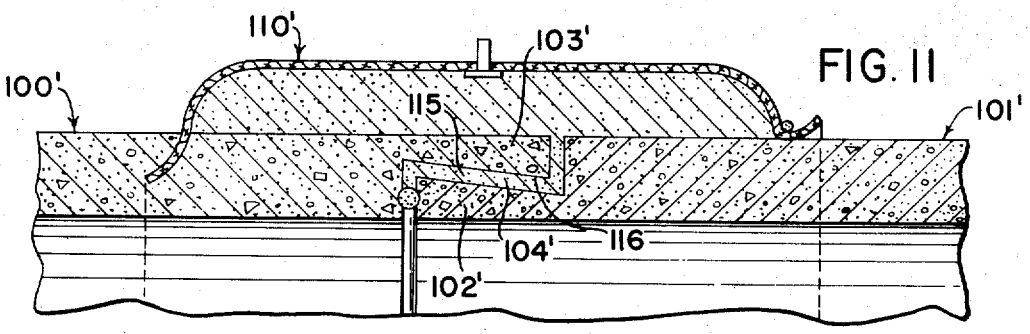
FIGURE 11 is a view similar to FIGURE 10 but showing an alternative arrangement wherein the joint of the pipe is locked together.

FIGURES 10 and 11 show the application of the invention to encasing the abutting ends of two pipes 100 and 101 with cement and for providing a seal between these ends. In this embodiment of the invention the pipe 101 has an axially extending flange 102 on its inner surface while the pipe 100 has an axially extending flange 103 on its outer surface, the respective outer and inner diameters of which are such that there will be a slight space 104 therebetween. The pipes 100, 101 are then assembled with the flange 102 inside of the flange 103 and with the axial end 105 of the flange 102 being spaced from the axially facing surface 106 of the rabbet which forms the flange 103 and a porous sealing member 107 in the form of a continuous ring is positioned in radially aligned grooves in the surfaces 105, 106. Thereafter, a form 110 in the shape of a sleeve of porous fabric material is positioned around the pipes 100, 101 so as to extend axially beyond both ends of the joint to be closed and the ends are tied to the outer surfaces of the pipe 100, 101 by means of ties 111 similar to that described with reference to the forms in FIGURE 6. Thereafter the form 110 is inflated with a cementitious slurry 112 through nipple 46. The slurry flows through the space 104 up against the sealing ring 107. Thereafter the liquid of the slurry flows through the porous seal 107 leaving behind a gradually thickening slurry in the same manner the slurry 112 in the form 110 gradually thickens in a manner as above described.

The result is a joint between the two pipes which is strong and water impervious.

FIGURE 11 shows a construction similar to FIGURE 7 with two exception namely that: one end of the form 110' is fastened to pipe 100' by casting it into the wall thereof at the time of manufacture while the other end is tied to the surface of the other pipe 101' after assembly as with FIGURE 7; and that the radially outer surface 115 of flange 102' tapers radially outwardly toward the end while the inwardly facing surface 116 of the flange 103 tapers radially inwardly toward the end of the flange 103'. The minimum inside diameter of the surface 116 is just greater than the maximum outer diameter of the surface 115 so that the flanges 102' and 103' can be telescoped together. When the space 104' defined by the surfaces 115, 116 is filled with a hardened cementitious material, it will be seen that this material is under compression to resist tensile forces attempting to pull the pipes 100', 101' axially apart. This cement in the space 104' is in compression which, as is known, is the maximum strength for cement.

In all of the embodiments shown, reinforcements for the concrete have not been shown. Obviously such renforcements can be positioned in the space to be enclosed by the form prior to the positioning of the form. Spacer members such as those shown at 120 in FIGURE 4 may also be employed in all of the embodiments. Also the pipes of FIGURES 9–11 can be positioned with their axes vertical or at an angle. Also the pipe 80 of FIGURE 9 can be made collapsible so that when the cement has hardened, the pipe may be removed leaving a cement cylinder or pipe which may be used for various purposes. Thus the invention contemplates the manufacture of cement pipe.

It will be seen that embodiments of the invention have been described which accomplish all of the objectives heretofore set forth and others and that an arrangement for coating elongated rigid members with cement has been provided wherein the advantages of a readily pumpable, high water-cement ratio slurry are obtained while obviating the disadvantages of such a slurry, namely, long setting up periods for the cement and reduced strengths.

The invention has been described with reference to preferred embodiments. Obviously modifications and alterations will occur to others upon a reading and understanding of this specification and it is my intension to include all such modifications and alterations insofar as they come within the scope of the appended claims.

Having thus described my invention, I claim:

1. A method of encasing at least a portion of an elongated rigid member with a hardened cement, comprising the steps of:

providing a material at least in part porous;

positioning said material around such member to form a sleeve;

pressing the ends of such sleeve against said member;

pumping into the space between the sleeve and the member, a cementitious slurry of a known liquid-cement ratio;

continuing the pumping until the sleve is inflated and a pressure is built up;

maintaining the pressure on the slurry in the space between the sleeve and the member to force substantially only some of the liquid outwardly through the porous part of said material thereby lowering the liquid-cement ratio to a predetermined level; and allowing the slurry to harden.

2. The method of claim 1, wherein said step of forming a sleeve around such member comprises wrapping a sheet of material around the member, folding outwardly the longitudinal edges of said material;

placing the longitudinal folded edges of the sheet in abutting engagement; and fastening such edges together.

3. The method of claim 1 and further including the steps of:

forming a second sleeve of at least partially porous material around the member with one axial end thereof overlapping the first mentioned sleeve and the other end thereof extending along the member;

pressing said one axial end of the second sleeve into engagement with the first sleeve and the previously hardened cementitious slurry and pressing the other axial end of the second sleeve into engagement with the outer surface of the member;

pumping into the space between said second sleeve and said member a cementitious slurry until the sleeve is inflated;

continuing the pumping until some of the liquid of the slurry has passed through the porous portion of said second sleeve thereby lowering the liquid-cement ratio of the slurry;

allowing the slurry in said second sleeve to harden; and repeating the process until the desired length of the rigid member is encased in cement.

4. The method of claim 1, wherein said elongated rigid member comprises spaced apart coaxial pipes and further including the steps of:

placing a porous sealing member between the spaced opposed ends of the pipes; and positioning the sleeve of material around the adjacent ends of the pipe with one axial end of the sleeve being pressed against the outer surface of one pipe and the other axial end of the sleeve being pressed against the outer surface of the other pipe.

5. The method of claim 1, and further including the steps of:

forming a circumferentially extending tube in at least one end of said sleeve of material;

inflating the tube with a cementitious slurry so that the inner surfaces of the tube tightly grip the outer surface of the member before pumping the cementitious slurry into the space between the sleeve and the rigid member.

6. The method of claim 1, wherein the pressure on the slurry is maintained until a filter bed of particles in the slurry is formed adjacent the inner surface of the porous part of the sleeve and substantially only liquid passes through the bed and the porous material.

7. The method of claim 4, wherein the pressure maintained on the slurry also forces liquid to pass through the porous sealing member.

8. The method of claim 1, wherein the liquid is forced through the porous material until the slurry is no longer flowable.

9. The method of claim 6, wherein sufficient liquid is forced through said bed and porous material to wash away substantially any particles that may have passed through the material and collected on the exterior thereof.

10. The method of claim 1, wherein the sleeve is positioned with at least a portion of the porous part of said material being free from engagement with any surface.

*11. A method of forming a mass of hardened cement around at least a portion of a generally vertically extending rigid member, said method comprising the steps of:*

*providing a material at least in part porous;*

*positioning said material around such member to form a sleeve extending from a lower position to an upper position;*

*pressing said sleeve against said member at least at said lower position;*

*supporting said sleeve with respect to said rigid member at said upper portion to define a space between said sleeve and said member;*

*pumping, into the space between the sleeve and the member, a cementitious slurry of a known liquid-cement ratio;*

*preventing said slurry from passing said upper position;*

*continuing the pumping until said sleeve is inflated and a pressure is built up;*

*maintaining the pressure on the slurry in the space between the sleeve and the member to force some of the liquid outwardly through the porous part of said material thereby lowering the liquid-cement ratio to a predetermined level; and*

*allowing the slurry to harden.*

*12. A method as defined in claim 11 including the additional step of placing a rigid form around said sleeve.*

*13. A method of forming a mass of hardened cement around at least a portion of an elongated rigid member, said method comprising the steps of:*

*(a) providing a material at least in part porous;*

*(b) positioning said material around such member to form a sleeve extending between first and second longitudinally spaced positions;*

*(c) pressing said sleeve against said member at said first position;*

*(d) supporting said sleeve in spaced relationship to said member at said second position;*

(*e*) *pumping, into the space between the sleeve and the member, a cementitious slurry of a known liquid-cement ratio;*

(*f*) *preventing said slurry from passing said second position;*

(*g*) *continuing the pumping until said sleeve is inflated and a pressure is built up;*

(*h*) *maintaining the pressure on the slurry in the space between the sleeve and the member to force some of the liquid outwardly through the porous part of said material thereby lowering the liquid-cement ratio to a predetermined level; and*

(*i*) *allowing the slurry to harden.*

References Cited

The following references, cited by the Examiner, are of record in the patented file of this patent or the original patent.

UNITED STATES PATENTS

| | | | |
|---|---|---|---|
| Re. 25,614 | 7/1964 | Turzillo | 61—35 |
| 1,421,857 | 7/1922 | Store | 264—31 |

DONALD J. ARNOLD, Primary Examiner

U.S. Cl. X.R.

264—31, 35, 36